Figure 1:
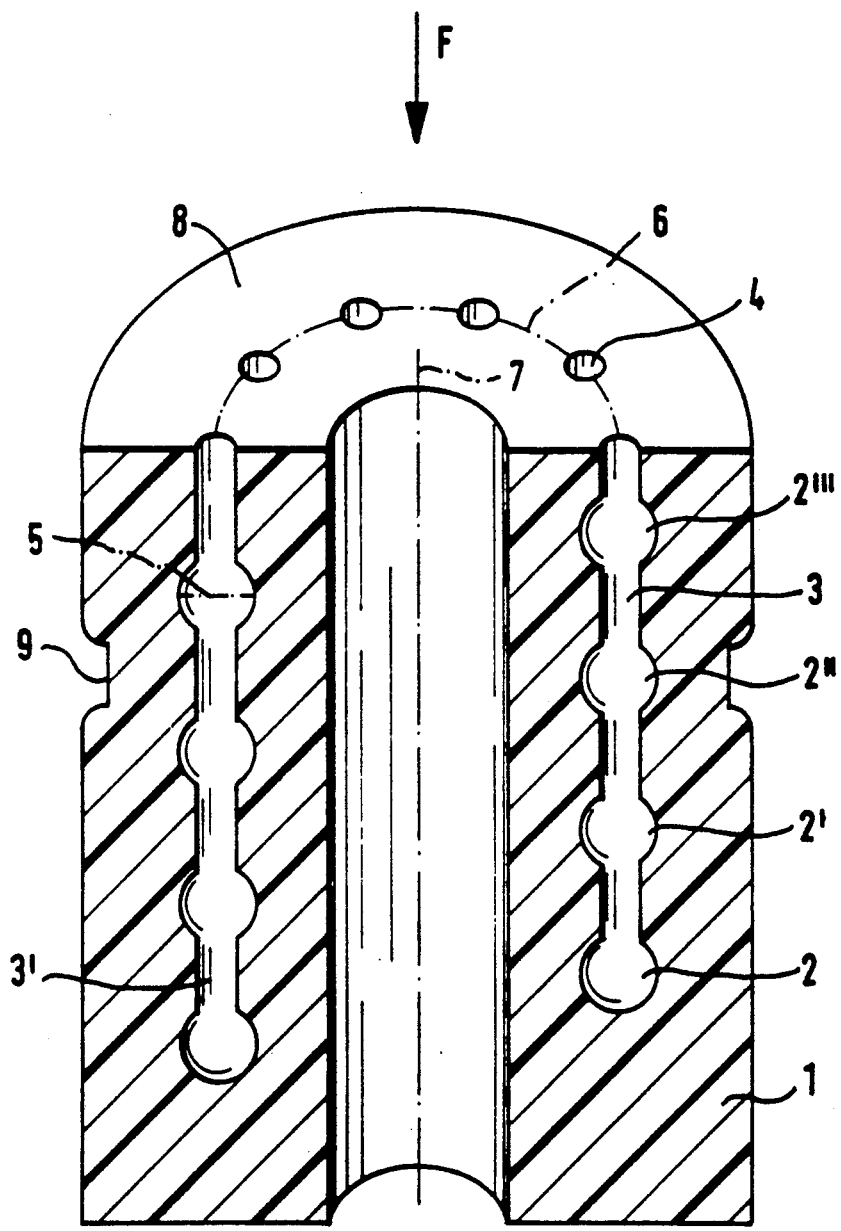

United States Patent [19]
Wolf et al.

[11] Patent Number: 5,014,967
[45] Date of Patent: May 14, 1991

[54] SPRING ELEMENT

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 265,605

[22] Filed: Nov. 1, 1988

[30] Foreign Application Priority Data

Nov. 23, 1987 [DE] Fed. Rep. of Germany ....... 3739638

[51] Int. Cl.[5] .......................... F16F 1/36; B60G 11/22
[52] U.S. Cl. .................................... 267/153; 267/292; 267/145
[58] Field of Search ............... 267/257, 258, 292, 293, 267/153, 140, 141, 145; 248/609, 560, 634, 562; 5/468, 461, 450; 181/207, 285, 288, 284, 286, 293

[56] References Cited

U.S. PATENT DOCUMENTS

| | | | |
|---|---|---|---|
| 168,845 | 10/1875 | Pratt | 267/292 |
| 2,494,019 | 1/1950 | Ware | 267/292 X |
| 2,750,606 | 6/1956 | Freelander et al. | 5/450 X |
| 4,143,612 | 3/1979 | Ticknor | 267/140 X |
| 4,750,720 | 6/1988 | Wolf et al. | 267/140.1 X |
| 4,776,573 | 10/1988 | Wolf et al. | 267/140.1 |
| 4,807,857 | 2/1989 | Wolf et al. | . |
| 4,861,003 | 8/1989 | Wolf et al. | . |
| 4,895,355 | 1/1990 | Wolf et al. | . |

FOREIGN PATENT DOCUMENTS

| | | | |
|---|---|---|---|
| 1500631 | 4/1969 | Fed. Rep. of Germany | 267/292 |
| 0037675 | 3/1977 | Japan | 267/292 |

*Primary Examiner*—Robert J. Oberleitner
*Attorney, Agent, or Firm*—Lowe, Price, LeBlanc, Becker & Shur

[57] ABSTRACT

In a spring element according to the present invention, all channels formed in the elastomer block are mutually parallel and all cavities formed in the elastomer block, too, which are intersected by said channels, are arranged like a cubic-free-centered sphere packing in reverse order. Comprising a good mechanical lateral rigidity, a spring element according to the present invention shows exceptionally good acoustic insulating and damping facilities.

7 Claims, 2 Drawing Sheets

SPRING ELEMENT

DISCLOSURE

1. Technical Field

The present invention relates to a spring element, and more particularly, to a spring element for an engine mount.

2. Background Art

It is known to provide an elastomer block serving as a buffer or a bearing with cylindrically-shaped channels which cross in space without intersecting each other. A characteristic curve of this spring element is thus achieved which rises more gradually than the characteristic curve of the same elastomer block formed without channels.

When using such spring elements, the spring characteristics may be changed only moderately with respect to a softer slope if the mechanical rigidity of the elastomer block may not be deteriorated too much. Additionally, for many technical applications, for example when using such spring elements for engine suspension in vehicle construction, the acoustic damping facilities of these known spring elements are not satisfactory. This means that body-transmitted acoustic waves passed into the spring element through, for example, a first support coupling element, are transferred nearly undamped to a second support coupling element fixed at the opposite side of the spring element. When using such a spring element for engine suspension, this means that acoustic interfering frequencies generated in the engine are transmitted undamped to the chassis and thereby to the passengers' cabin.

In a known spring element, improved acoustic damping facilities between the two load supporting parts of the bearing are achieved by the channels crossing each other in space in different planes, without intersecting each other, but intersecting additional cavities, the cross-section of which cavities with respect to the radial plane of the cavities is larger than the cross-section of the channels in the same plane. These cavities are spherically-shaped. In such a known structure, particularly effective acoustically damping facilities between the two load supporting parts of the bearing are achieved if the vector of the load is oriented perpendicular to the groups of channels and the spherical cavities are distributed homogeneously in the form of a cubic-body-centered sphere-packing. By that arrangement, the solid material bridges extending linearly through the elastomer block from the first load supporting part of the bearing to the opposite second load supporting part are reduced to a minimum resting cross-section. This contributes essentially to good damping with respect to body-transmitted acoustic waves.

However, these good acoustic damping facilities and the spring characteristic, which is soft with respect to a direction perpendicular to the groups of channels crossing in space, together with a high mechanical rigidity of the elastomer block in the same direction are connected basically with mechanical-constructive disadvantages in a direction parallel to the groups of channels when the spring element is oriented perpendicular to the vector of the load. Naturally, the transversal stiffness of this known bearing is smaller than the transversal stiffness of a comparable solid-rubber buffer. Additionally, the mechanical rigidity in this direction, for example the initial tearing strength and the tear propagation strength, is considerably smaller than the rigidity of a solid-rubber block. As can be seen easily, these characteristics in the direction perpendicular to the orientation of the groups of channels are desirable, while, normally, these characteristics in the direction parallel to the orientation of the groups of channels are not acceptable.

SUMMARY OF THE INVENTION

It is an object of the present invention to provide a spring element as described above, having soft spring characteristic and good acoustic damping facilities together with improved elastic and other mechanical characteristics, especially an improved tear strength, not only in the direction of the vector of the load, but in a direction perpendicular to the load vector.

According to the present invention, this object is solved by a spring element wherein the channels formed in the elastomer block are not arranged in groups of mutually parallel channels, which are crossing in space without intersecting each other, but that all of the channels in a spring element according to the present invention are mutually parallel. The cavities which are intersected by these mutually parallel channels are arranged like a two- or three-dimensional cubic-face-centered sphere packing, which means that the cavities are in reverse order with respect to their nearest neighbours. The expression "like a two- or three-dimensional cubic-face-centered sphere packing" is meant to comprise a distribution of said cavities in an exactly geometrical cubic-face-centered or hexagonal lattice, which may be two- or three-dimensional, as well as a distribution of said cavities, the geometrical location of which distribution is a curved area or a curved space, for example the convex surface of a cylinder or a cylindrically-shaped annular section. The channels have a radial cross sectional area in the range of about 25% to 75% of the cross sectional area of the cavity intersected by the respective channel.

An unexpected result of such a spring element comprising this arrangement is that, naturally, first of all dependent from the dimensions in the shape of the spring element, this structure can be loaded advantageously in the direction of the mutually parallel channels as well as in the direction of the radial plane of the channels. Compared with the bearing according to the state of the art described above, a spring element according to the present invention is slightly harder with respect to its spring characteristics when the load is acting in the axial direction of the spring element, but the mechanical rigidity, especially with respect to vibrations, in a radial direction with respect to the channels is substantially higher. Additionally, unexpectedly and surprisingly, a spring element according to the present invention comprises good acoustic damping facilities, which means that the first load supporting part of the bearing and the opposite second load supporting part of the bearing are acoustically insulated, when loaded axially as well as when loaded radially. This acoustic insulating behaviour of the spring element according to the present invention is nearly the same as that of a special spring element or a special bearing designed for acoustic damping. This surprising effect is probably caused by two influencing factors. On the one hand, in a spring element according to the present invention, the arrangement of the cavities in space is substantially tighter than in a spring element according to the state of the art and, on the other hand, the damping effect in the cavities themselves seems to be substantially larger than estimated before.

It is another substantial advantage of a spring element according to the present invention that it can be loaded elastically and without any disadvantages not only perpendicular to the orientation of the channels, but in the direction of the channels, too. While the known bearing is not sufficiently mechanically stable any more when a load, which can be supported in a direction perpendicular to the groups of channels without any problems, is acting transversely, which means in the direction of the longitudinal axis of the channels, a spring element according to the present invention comprises practically the same mechanical stability in both the axial and the radial directions. This can be explained by that the channels in a spring element according to the present invention are better stabilized in the elastomer block than in a spring element according to the state of the art. While in a structure, where the groups of channels are crossing each other in space, the channels turn to kink relatively easy when loaded axially caused by the missing stabilizing facilities of the material and of the geometrical structure, in a spring element according to the present invention the channels are stabilized with respect to the axial direction of the channels, too. On the one hand, this is caused by that the solid material bridges around each of the channels are thicker and, on the other hand, that all channels in the elastomer block are mutually parallel. By that constructive reinforcement it is prevented that channels extending transversely to other channels are bent when the load to be supported is not exactly acting perpendicular, which effect is initiating the kinking of the axially loaded channels.

In other words, in contrast to a spring element according to the state of the art, which can be loaded conveniently only in one single direction, the radial and/or axial load-bearing-capacity of a spring element according to the present invention provides many new constructive possibilities to a design engineer, although both spring elements comprise nearly the same acoustic damping facilities, respectively acoustic insulating facilities, between the first load supporting part and the opposite second load supporting part of the bearing. For example, the spring element according to the present invention is ideal for a so-called press-in bearing, which is a rubber buffer pressed into an opening in a mounting frame and which is used frequently in vehicle construction. Spring elements according to the state of the art cannot be used for that purpose because of the lack of transversal stability.

The advantages of a spring element according to the present invention are first of all of importance for spring elements with a shape different from a spherical or a cubic shape. This means especially an elastomer block which is a cuboid, a cylinder or a prism, if inside this elastomer block the channels are preferably parallel to the longitudinal axis of the elastomer block.

Especially, according to a special embodiment of the present invention, in a spring element with one longer and two shorter axes, the channels are preferably open at one side and closed at the other side like a blind hole and extend from one of the outer surfaces of the block into the elastomer block only along a certain part of the axial length of the elastomer block. Alternatively, said channels open at one side may extend from two opposite front sides into the elastomer block. However, preferably, these two groups of axially parallel channels are not overlapping each other in a longitudinal direction and are coaxial with respect to each other, whereas the number of channels in each group is preferably the same.

Especially, when used as a pressed-in bearing, the elastomer block is preferably cylindrically-shaped and the channels are preferably arranged in this cylindrical elastomer block on a cylindrically-shaped area which is coaxial with respect to the cylindrically-shaped elastomer block. Especially, when using a cylindrical elastomer block having a relatively large diameter compared with the radial dimensions of the channels and the cavities, said channels and said cavities may be arranged and distributed on a plurality of cylindrically-shaped areas, which areas are mutually coaxial and coaxial with respect to the elastomer cylinder, too. However, in this arrangement, too, the cavities in two neighbouring cylindrically-shaped areas are in reverse order to each other, which means that the cavities are in reverse order in one and the same radial plane as well as in "radially extending areas", which are plane areas extending radially, diametrically respectively, and axially. These "radially extending areas" are angularly spaced with respect to the longitudinal axis of the spring element.

Especially, when the spring element according to the present invention is used for bearings, particularly pressed-in bearings or sleeve bearings, the elastomer block, preferably, comprises as known per se along its whole longitudinal axis a central hole open at both sides which may contain an inner sleeve if the bearing is a radial sleeve bearing. If the load to be supported elastically is acting obliquely to one of the main axis of the spring element according to the present invention and the spring element must be loaded uniformly and homogenously, the channels and the cavities obviously may be distributed unevenly inside the material of the elastomer block according to the special requirement. Preferably and especially, when the direction of the vector of the load to be supported is expected to be at least essentially parallel to one of the main axis of the spring element, the channels and the cavities are distributed in space at least essentially as uniformly as possible inside the material of the elastomer block. Only for some very special requirements it may be recommendable to provide a thicker elastomer layer in the edge areas of the elastomer block, which edge areas may be lateral areas as well as front side areas.

Figure 2:
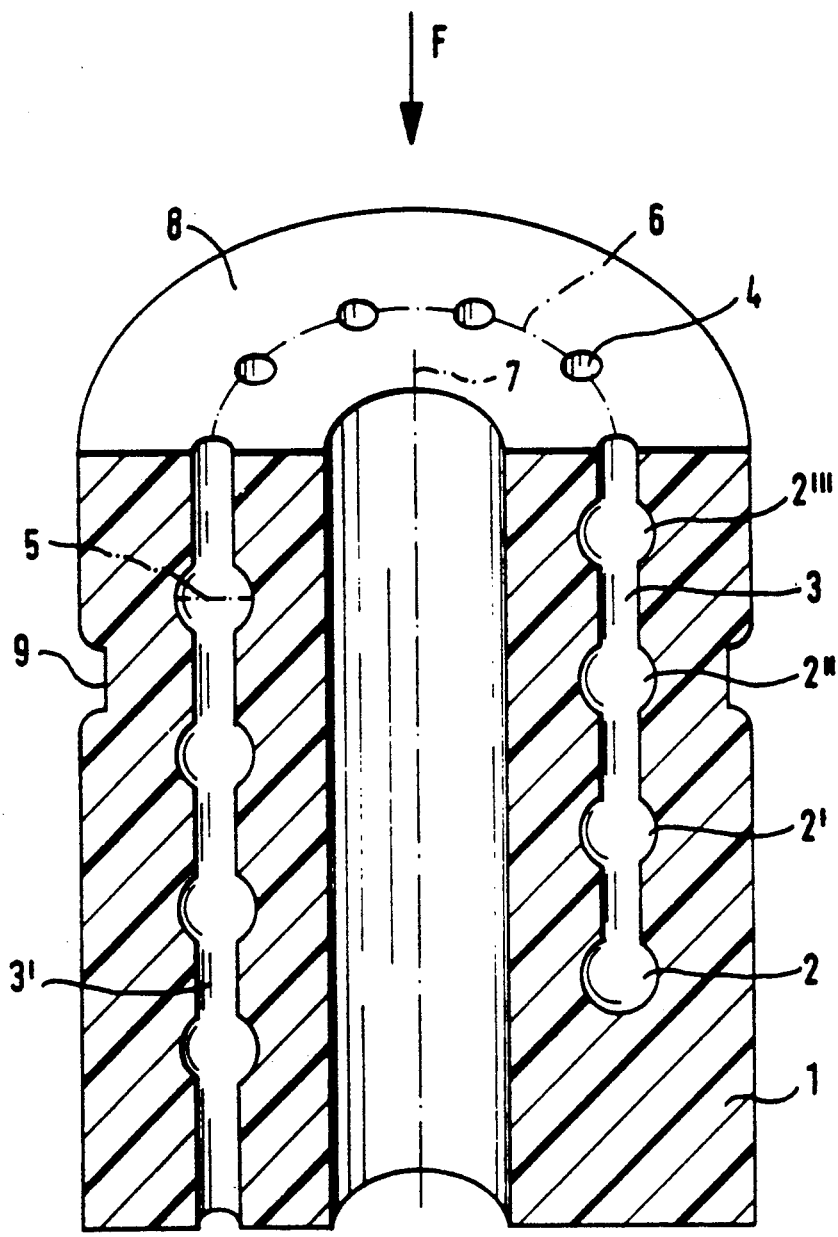

FIG. 2 shows schematically a partial perspective and partial axially sectioned view of a modification to the FIG. 1 embodiment.

The invention will now be explained in more detail by one example of an embodiment with reference to the accompanying drawings.

FIG. 1 shows schematically in partial perspective and partial axially sectioned a cylindrical spring element according to the present invention.

BEST MODE FOR CARRYING OUT THE INVENTION

The only figure shows schematically in a perspective and axially sectioned view an embodiment of the spring element according to the present invention. The spring element, which is in this embodiment a pressed-in bearing, is dimensioned with respect to a mainly axially acting load which is illustrated by the load vector F. The spring element shown in this figure comprises an elastomer block 1, which is interspersed with cavities 2 and channels 3. The cavities 2 are spherically-shaped. The longitudinal central axis of the channels 3 extends through the center of the spherical cavities 2. All of the spherical cavities 2,2',2",2'" are equidistantly spaced and aligned at the longitudinal central axis of the channels 3.

The radial cross-sectional area or opening 4 of the channels 3 is about half as large as the maximum cross-sectional area 5 of the spherical cavities 2 in that plane.

The channels 3 are distributed on a cylindrically-curved area 6 inside the elastomer material of the cylindrically-shaped elastomer block 1. The channels 3 are extending parallel to the longitudinal central axis 7 of the elastomer block 1. The cavities 2 aligned on the axis of the channels 3 are in reverse or staggered order with respect to each other, which means that the poles of the spherical cavities projecting in the radial plane at most to the neighbouring spherical cavity are at least essentially in the same radial plain which contains the midpoint of the distance of the two neighbouring spherical cavities of the neighbouring channel. The cavities distributed in such a way are forming a cubic-face-centered or hexagonal lattice which is arranged on a cylindrically-curved surface area.

In the embodiment shown in FIG. 1, the channels 3 are open at one side, which is the front side of the elastomer block 1. At the opposite side, the channels 3 are closed, which means that the channel portions 3 are formed like blind holes and are extending along a certain part of the axial length of the elastomer block 1. More exactly, the channels 3 are extending from the front side 8 supporting the load into the elastomer block 1. However, in FIG. 2 it can be seen that at least one channel may open to opposite end faces of the elastomer block.

Furthermore, the elastomer block 1 according to FIG. 1 comprises a relatively large axially extending central opening, which is open at both sides and which may be used, for example, for fixing load coupling parts.

As can be seen from FIG. 1, the channels 3 and the cavities 2 inside the elastomer block 1 are embedded sufficiently in solid rubber material such that an annular groove 9 in the outer surface of the cylindrically-shaped elastomer block 1 serving for fixing the pressed-in elastomer block 1 in a mounting frame comprises a sufficient distance from the channels and cavities formed inside the elastomer material.

We claim:

1. A spring element, comprising an elastomer block interspersed with cavities and channels, said cavities being substantially spherically-shaped cavities spaced from each other and intersecting said channels, said channels having a radial cross-sectional area in the range from about 25% to 75% of the cross-sectional area of the cavity intersected by the respective channel, wherein said channels formed in the elastomer block are substantially parallel to each other and said cavities formed in the block are arranged in a staggered order as a cubic-face-centered sphere packing.

2. A spring element according to claim 1, wherein the elastomer block is one of a cuboid, a prism or a cylinder and said channels are parallel to the longitudinal axis of the elastomer block.

3. A spring element according to claim 2, wherein said channels open to one end face of the block and terminate within the block as a blind hole.

4. A spring element according to claim 3, wherein at least one channel opens to opposite end faces of the elastomer block.

5. A spring element according to claim 3, wherein said elastomer block is substantially cylindrically-shaped and said channels are circumferentially arranged within the block along a cylindrical region which is coaxial with respect to the substantially cylindrically-shaped elastomer block.

6. A spring element according to claim 5, wherein said elastomer block is formed with a central longitudinal passage extending along the longitudinal axis of the block and which passage opens to both ends of the block.

7. A spring element according to claim 1, wherein said channels and said cavities are distributed symmetrically within the elastomer block about the longitudinal axis thereof.

* * * * *